（12） United States Patent
Katsurahara (10) Patent No.: US 8,286,472 B2
(45) Date of Patent: Oct. 16, 2012

(54) DIAGNOSTIC SYSTEM FOR VARIABLE VALVE TIMING CONTROL SYSTEM

(75) Inventor: Hiroshi Katsurahara, Anjo (JP)

(73) Assignee: Denso Corporation, Kariya (JP)

( * ) Notice: Subject to any disclaimer, the term of this patent is extended or adjusted under 35 U.S.C. 154(b) by 375 days.

(21) Appl. No.: 12/786,952

(22) Filed: May 25, 2010

(65) Prior Publication Data

US 2010/0300189 A1  Dec. 2, 2010

(30) Foreign Application Priority Data

May 27, 2009  (JP) ................................. 2009-128352

(51) Int. Cl.
*G01M 15/04* (2006.01)
(52) U.S. Cl. .................................................. 73/114.79
(58) Field of Classification Search .............. 73/114.38, 73/114.55, 114.77, 114.79
See application file for complete search history.

(56) References Cited

U.S. PATENT DOCUMENTS

| 6,094,974 A | 8/2000 | Yamagishi et al. |
| 8,146,556 B2 * | 4/2012 | Yoshikawa et al. ...... 123/179.16 |
| 2010/0000478 A1 * | 1/2010 | Yoshikawa et al. ........ 123/90.15 |
| 2010/0236523 A1 * | 9/2010 | Saruwatari et al. ........... 123/436 |

FOREIGN PATENT DOCUMENTS

JP  5-1574  1/1993

* cited by examiner

*Primary Examiner* — Eric S McCall
(74) *Attorney, Agent, or Firm* — Nixon & Vanderhye PC (57) ABSTRACT

A fuel diluting quantity is estimated based on an alcohol concentration of the fuel. A response-deterioration determination value is corrected according to the estimated fuel diluting quantity. The response-deterioration determination value can be properly established even though the responsiveness of the variable valve timing controller is varied due to a variation in viscosity of the lubricant. Thereby, even when the responsiveness of the variable valve timing controller is varied (deteriorated) due to an increase in the fuel diluting quantity, it can be avoided that the computer determines that the variable valve timing controller has a defect.

5 Claims, 6 Drawing Sheets

DIAGNOSTIC SYSTEM FOR VARIABLE VALVE TIMING CONTROL SYSTEM

CROSS-REFERENCE TO RELATED APPLICATION

This application is based on Japanese Patent Application No.2009-128352 filed on May 27, 2009, the disclosure of which is incorporated herein by reference.

FIELD OF THE INVENTION

The present invention relates to a diagnostic system for a variable valve timing control system which adjusts a valve timing of an internal combustion engine.

BACKGROUND OF THE INVENTION

An internal combustion engine for a vehicle is provided with a variable valve timing controller which adjusts a valve timing (a valve opening timing and a valve closing timing) of an intake valve and an exhaust valve in order to improve its output and fuel economy and to reduce emission. The variable valve timing controller adjusts a rotation phase of a camshaft relative to a crankshaft so that valve timings of the intake valve and the exhaust valve are varied.

Also, gasoline, alcohol, and mixed fuel of gasoline and alcohol are used as fuel for an internal combustion engine in order to reduce $CO_2$ emissions and utilize petroleum substitute fuel. When the mixed fuel of which alcohol concentration has varied is supplied to a fuel tank, the alcohol concentration of the fuel in the fuel tank is also varied.

JP-05-1574A shows a valve timing controller in which an alcohol concentration in the fuel is detected by an alcohol concentration sensor and the valve timing is adjusted according to the detected alcohol concentration.

Also, JP-11-2141A (U.S. Pat. No. 6,094,974) shows a diagnosing apparatus and method. In this apparatus and method, when a specified time period has elapsed from a time when a target camshaft phase (a target valve timing) was varied, it is determined whether the variable valve timing controller has a defect based on whether a difference between the target camshaft phase and an actual camshaft phase is greater than a specified value.

When the engine has been stopped for a long time period, an engine temperature becomes lower than or equal to an ambient temperature. In such a condition, a part of fuel injected by an injector flows down along an inner surface of a cylinder toward an oil pan. This fuel is mixed with a lubricant (engine oil) in the oil pan, so that the lubricant is diluted with the fuel. Especially, when the alcohol concentration of the fuel becomes high, the fuel quantity mixed with the lubricant (fuel diluting quantity) tends to increase.

Figure 2:
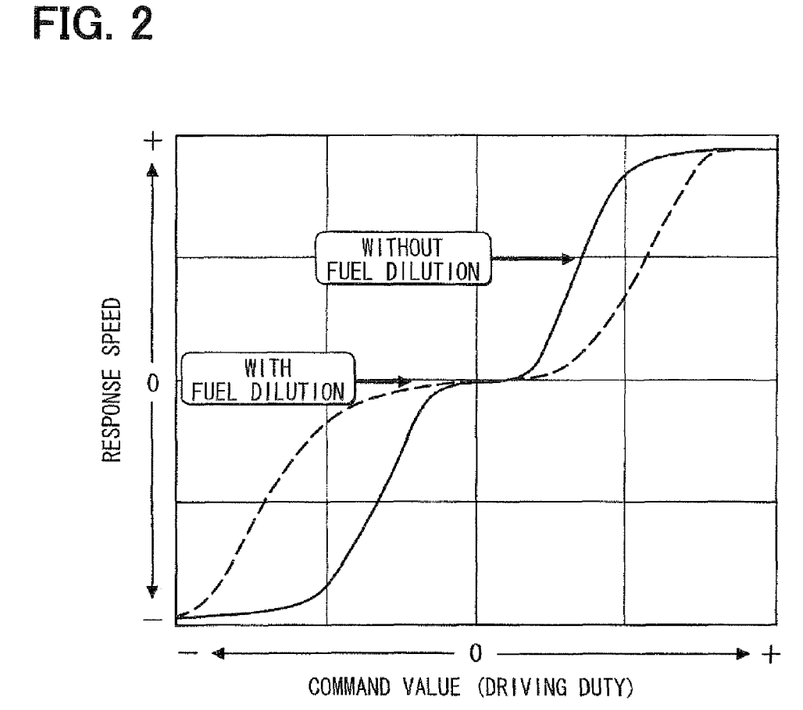
FIG. 2 is a chart for explaining a variation in an operation characteristic of a variable valve timing controller due to an increase in a fuel diluting quantity.
Figure 3A:
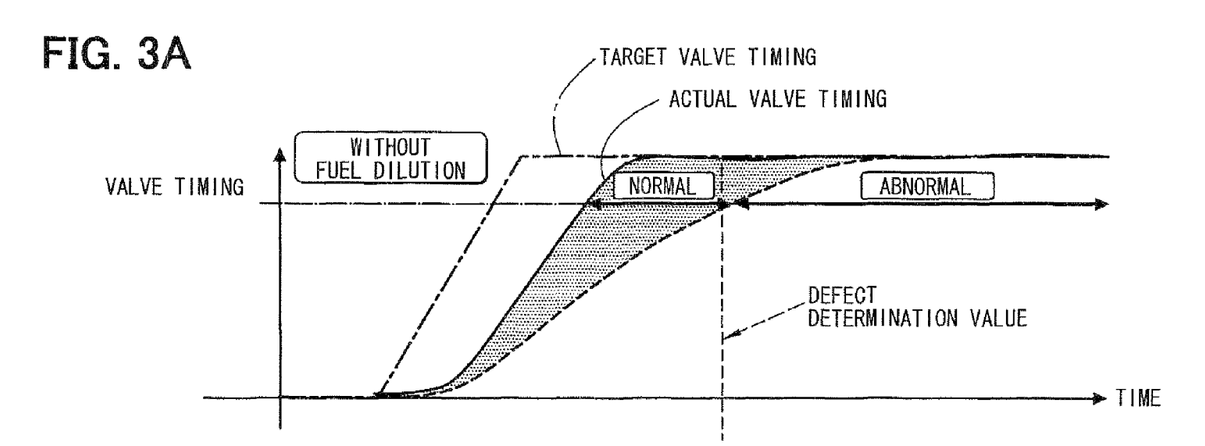
FIGS. 3A and 3B are charts for explaining a variation in a responsiveness of a variable valve timing controller due to an increase in a fuel diluting quantity.
Figure 3B:
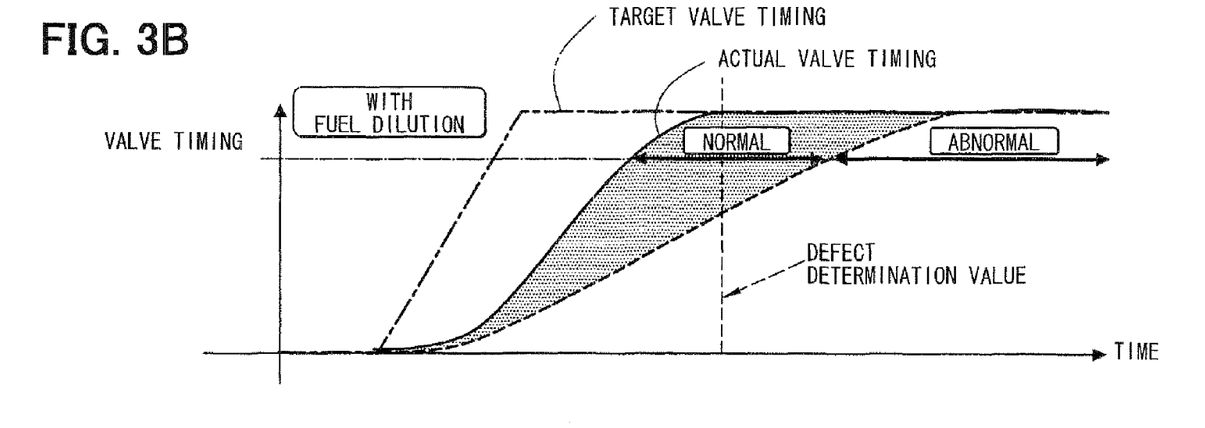

The variable valve timing controller is operated with the lubricant. As shown in FIG. 2, when the fuel diluting quantity is increased, a viscosity of the lubricant is varied, so that an operating characteristic of the variable valve timing controller is varied. The operating characteristic of the variable valve timing controller represents a relationship between a command value and a response speed of the valve timing controller. As shown in FIGS. 3A and 3B, when the fuel diluting quantity is increased, a responsiveness of the valve timing controller is varied and a normal responsiveness range is also varied. The normal responsiveness range represents a range where the responsiveness of the valve timing controller is determined as normal. Thus, if it is determined whether the responsiveness of the valve timing controller is normal or abnormal based on a defect determination value in a case that the fuel diluting quantity is large as well as in a case that the fuel diluting quantity is small, it is likely that a computer erroneously determines that the responsiveness of the valve timing controller is faulty even though the variable valve timing controller has no defect. The condition where the responsiveness of the vale timing controller is varied due to an increase in the fuel diluting quantity may be erroneously determined as the condition where the valve timing controller is faulty.

SUMMARY OF THE INVENTION

The present invention is made in view of the above matters, and it is an object of the present invention to provide a diagnostic system for a variable valve timing controller, which is able to avoid an erroneous determination and to improve an accuracy of diagnosis of the variable valve timing controller.

A variable valve timing control system includes a hydraulic variable valve timing controller adjusting a valve timing of an intake valve and/or an exhaust valve with a lubricant of an internal combustion engine and a diagnosis means for diagnosing the variable valve timing controllers.

According to the present invention, the diagnostic system includes: an alcohol concentration determination means for detecting or estimating an alcohol concentration of a fuel supplied to the internal combustion engine; and a fuel diluting quantity estimation means for estimating a fuel diluting quantity based on the alcohol concentration. The fuel diluting quantity represents a fuel quantity mixed with the lubricant. Further, the diagnosis means includes a correcting means for correcting a determination condition based on the fuel diluting quantity. The diagnosis means performs a diagnosis of the variable valve timing controller by means of said corrected determination condition.

Since the fuel diluting quantity is estimated based on the alcohol concentration of the fuel, the fuel diluting quantity can be accurately estimated. Further, since the determination condition is corrected according to the estimated fuel diluting quantity, the determination condition can be properly established even though the responsiveness of the variable valve timing controller is varied due to a variation in viscosity of the lubricant. Thereby, even when the responsiveness of the variable valve timing controller is varied (deteriorated) due to an increase in the fuel diluting quantity, it can be avoided that the computer determines that the variable valve timing controller has a defect. The accuracy of the diagnosis can be improved.

Alternatively, the diagnostic system may further includes a prohibit means for prohibiting the diagnosis of the variable valve timing controller when the estimated fuel diluting quantity is greater than or equal to a specified value. When the fuel diluting quantity is greater than or equal to a specified value, it is determined that it is difficult to accurately diagnose the variable valve timing controller. The diagnostic system prohibits the diagnosis of the variable valve timing controller. Thus, an erroneous diagnosis can be surely avoided.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described, hereinafter.

[First Embodiment]

Figure 1:
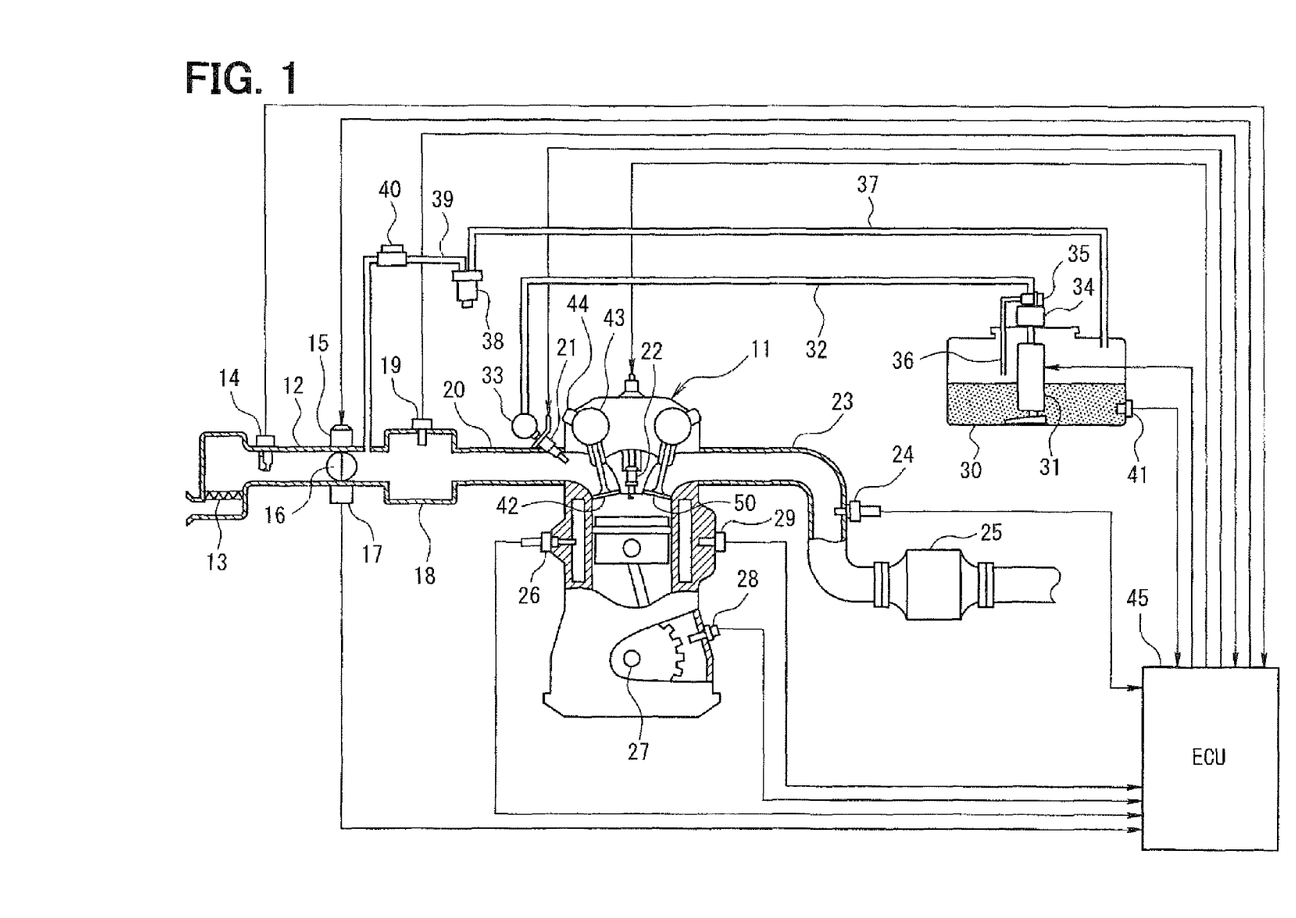
FIG. 1 is a schematic view of an engine control system according to a first embodiment of the present invention.

Referring to FIGS. 1 to 5, a first embodiment will be described hereinafter. FIG. 1 shows an engine control system. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 including an intake air pressure sensor 19 is provided downstream of the throttle valve 16. The intake air pressure sensor 19 detects intake air pressure. An intake manifold 20 which introduces air into each cylinder of the engine 11 is provided downstream of the intake pipe 12, and the fuel injector 21 which injects the fuel to an intake port is provided at a vicinity of an intake port of the intake manifold 20 of each cylinder. A spark plug 22 is mounted on a cylinder head of the engine 11 corresponding to each cylinder to ignite air-fuel mixture in each cylinder.

An exhaust gas sensor (an air fuel ratio sensor, an oxygen sensor) 24 which detects an air-fuel ratio of the exhaust gas is respectively provided in each exhaust pipe 23, and a three-way catalyst 25 which purifies the exhaust gas is provided downstream of the exhaust gas sensor 24.

The engine 11 is provided with a variable valve timing controller 43 which adjusts a valve timing of the intake valve 42. This variable valve timing controller 43 is hydraulically operated with a lubricant (engine oil) of the engine 11. The variable valve timing controller 43 adjusts a rotation phase of an intake camshaft (not shown) relative to a crankshaft 27 so that a valve timing of the intake valve 42 is varied.

Furthermore, the engine 11 is provided with an intake cam angle sensor 44 which detects a rotational angle of the intake camshaft and outputs an intake cam angle signal. A crank angle sensor 28 is arranged at a vicinity of the crankshaft 27 for detecting a rotational angle of the crankshaft 27. A crank angle and an engine speed are detected based on the output signal of the crank angle sensor 28. Based on the output of the crank angle sensor 28 and the output of the intake cam angle sensor 44, the actual valve timing of the intake valve 42 (actual camshaft phase) is detected. A coolant temperature sensor 26 detecting a coolant temperature and a knock sensor 29 detecting knocking of the engine are disposed on a cylinder block of the engine 11.

The engine 11 can use gasoline, alcohol such as ethanol and methanol, and alcohol-mixed fuel of gasoline and alcohol. Any one of gasoline, alcohol, and alcohol-mixed fuel is supplied to the engine 11. A fuel pump 31 which pumps up the fuel is provided in the fuel tank 30. The fuel discharged from the fuel pump 31 is sent to the delivery pipe 33 through the fuel pipe 32 and is distributed to the fuel injector 21 of each cylinder from this delivery pipe 33. A fuel filter 34 and a pressure regulator 35 are connected to the fuel pipe 32 at a vicinity of the fuel pump 31. A discharge pressure of the fuel pump 31 is adjusted to a predetermined pressure by the pressure regulator 35. A surplus of the fuel exceeding the predetermined pressure is returned to the fuel tank 30 through a fuel-return pipe 36.

An alcohol concentration sensor 41 (alcohol concentration determination means) detecting an alcohol concentration of the fuel is provided in the fuel tank 30. The alcohol concentration sensor 41 may be provided in a fuel passage (fuel pipe 32 or delivery pipe 33) between the fuel tank 30 and the fuel injector 21. Any type of alcohol concentration sensor can be used. For example, a capacitance type alcohol concentration sensor or an optical type alcohol concentration sensor can be used.

A canister 38 is connected to the fuel tank 30 through a fuel-vapor pipe 37. The canister 38 includes activated carbon which adsorbs a fuel vapor. A purge pipe 39 fluidly connects the canister 38 and the intake pipe 12. A fuel vapor purged from the canister 38 flows through the purge pipe 39. A purge control valve 40 is disposed in the purge pipe 39 for controlling a fuel vapor quantity flowing through the purge pipe 39.

The outputs of the sensors are inputted to an electronic control unit (ECU) 45. The ECU 45 includes a microcomputer which executes an engine control program stored in a Read Only Memory (ROM) to control a fuel injection quantity of the fuel injector 21 and an ignition timing of a spark plug 22 according to an engine running condition.

The ECU 45 executes a valve timing control routine. A target valve timing (target camshaft phase) of the intake valve 42 is computed based on the engine driving conditions. An actual valve timing (actual camshaft phase) of the intake valve 42 is detected based on the outputs signals from the crank angle sensor 28 and the intake cam angle sensor 44. The variable valve timing controller 43 is feedback controlled in such a manner that the actual valve timing agrees with the target valve timing.

Figure 4:
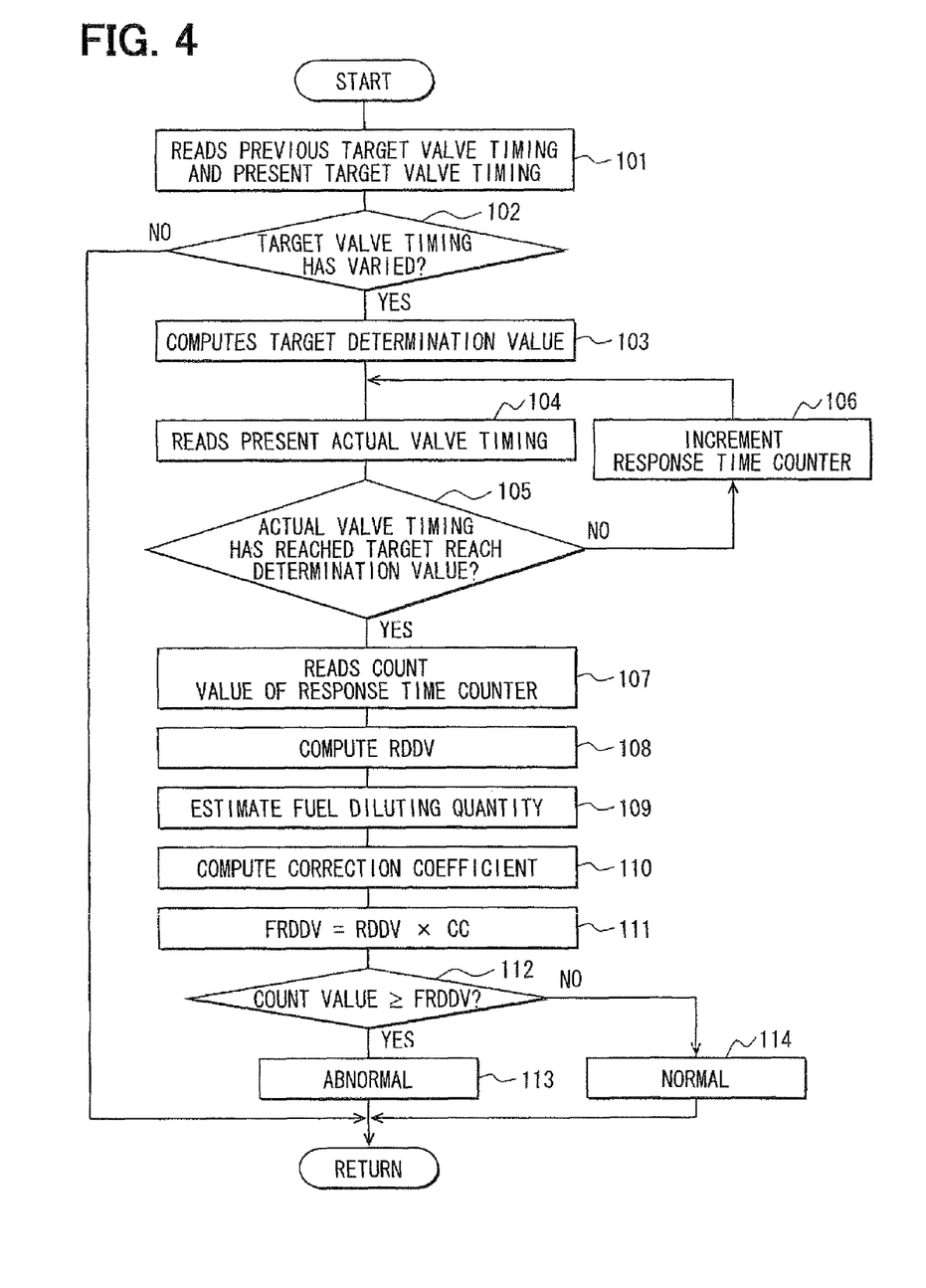
FIG. 4 is a flowchart showing a processing of a diagnosis routine according to the first embodiment.

Also, the ECU 45 executes a diagnosis routine shown in FIG. 4. When the target valve timing of the intake valve 42 is varied, a response time is obtained. This response time is a time period necessary for the actual valve timing of the intake valve 42 to reach a target reach determination value. For example, the target reach determination value corresponds to 90% of the target valve timing variation amount. This response time is compared with a response-deterioration determination value (defect determination value) in order to determine whether the variable valve timing controller 43 has a defect (deterioration in responsiveness).

When the engine 11 has been stopped for a long time period, an engine temperature becomes lower than or equal to an ambient temperature. In such a condition, a part of fuel injected by an injector 21 flows down along an inner surface of a cylinder toward an oil pan. This fuel is mixed with a lubricant (engine oil) in the oil pan, so that the lubricant is diluted with the fuel. Especially, when the alcohol concentration of the fuel becomes high, the fuel quantity mixed with the lubricant tends to increase.

The variable valve timing controller 43 is hydraulically operated with the lubricant of the engine 11. As shown in FIG. 2, when the fuel diluting quantity is increased, a viscosity of the lubricant is varied, so that an operating characteristic of the variable valve timing controller 43 is varied. The operating characteristic of the variable valve timing controller represents a relationship between a command value and a response speed of the valve timing controller. As shown in FIGS. 3A and 3B, when the fuel diluting quantity is increased, a responsiveness of the valve timing controller 43 is varied and a normal responsiveness range is also varied. The normal responsiveness range represents a range where the responsiveness of the valve timing controller is normal. Thus, if it is determined whether the responsiveness of the valve timing controller is normal or abnormal based on the defect determination value in a case that the fuel diluting quantity is large as well as in a case that the fuel diluting quantity is small, it is likely that a computer erroneously determines that the responsiveness of the valve timing controller 43 is faulty even though the variable valve timing controller 43 has no defect. The condition where the responsiveness of the vale timing controller 43 is varied due to an increase in the fuel diluting quantity may be erroneously determined as the condition where the valve timing controller is faulty.

According to the first embodiment, the fuel diluting quantity is estimated based on the alcohol concentration detected by the alcohol concentration sensor 41, a fuel injection quantity, and a coolant temperature. Then, the response-deterioration determination value (defect determination value) is varied according to the estimated fuel diluting quantity. Thereby, when the viscosity of the lubricant is varied according to the fuel diluting quantity and the responsiveness of the variable valve timing controller 43 is varied, the response-deterioration determination value is properly corrected.

Referring to FIG. 4, a processing of the diagnosis routine will be described hereinafter. The diagnosis routine is executed at a specified time interval while the ECU 45 is energized. This routine functions as a diagnosis means. In step 101, the computer reads a previous target valve timing and a present target valve timing of the intake valve 42. Then, the procedure proceeds to step 102 in which the computer determines whether the target valve timing has varied. Specifically, if a difference between a previous target valve timing and a present target valve timing is greater than a specified value, the computer determines that the target valve timing has varied.

When the answer is No in step 102, the procedure ends without performing the subsequent steps.

When the answer is Yes in step 102, the procedure proceeds to step 103. In step 103, the computer computes the target determination value which corresponds to 90% of variation in the target valve timing from the previous target valve timing to the present valve timing.

In step 104, the computer reads a present actual valve timing of the intake valve 42. In step 105, the computer determines whether the actual valve timing has reached the target reach determination value. When the answer is No in step 105, the procedure proceeds to step 106 in which a count value of a response time counter is incremented. Then, the procedure goes back to step 104.

When the answer is Yes in step 105, the procedure proceeds to step 107 in which the computer reads the count value of the response time counter. This count value of the response time counter corresponds to the response time in which the actual valve timing reach the target reach determination value.

Then, the procedure proceeds to step 108 in which the response-deterioration determination value (RDDV) is computed based on a map. This response-deterioration determination value depends on the coolant temperature detected by the coolant temperature sensor 26 and the target valve timing variation amount. The map of the response-deterioration determination value is previously formed based on experimental data and design data, and is stored in the ROM of the ECU 45.

Then, the procedure proceeds to step 109 in which the fuel diluting quantity is estimated based on a map. The fuel diluting quantity depends on the alcohol concentration detected by the alcohol concentration sensor 41, the fuel injection quantity and the coolant temperature. Generally, as the alcohol concentration of the fuel becomes higher, the fuel quantity flowing down along an inner surface of a cylinder increases so that the fuel diluting quantity increases. Also, as the fuel injection quantity becomes larger, the fuel quantity flowing down along the inner surface of the cylinder increases so that the fuel diluting quantity increases. Furthermore, as an engine temperature becomes lower, an evaporativity of the fuel becomes lower so that the fuel quantity flowing down along the inner surface of the cylinder increases. The map of the fuel diluting quantity is established in view of the above matters. Also, the map of the fuel diluting quantity is previously formed based on experimental data and design data, and is stored in the ROM of the ECU 45. The process in step 109 corresponds to a fuel diluting quantity estimation means.

Figure 5:
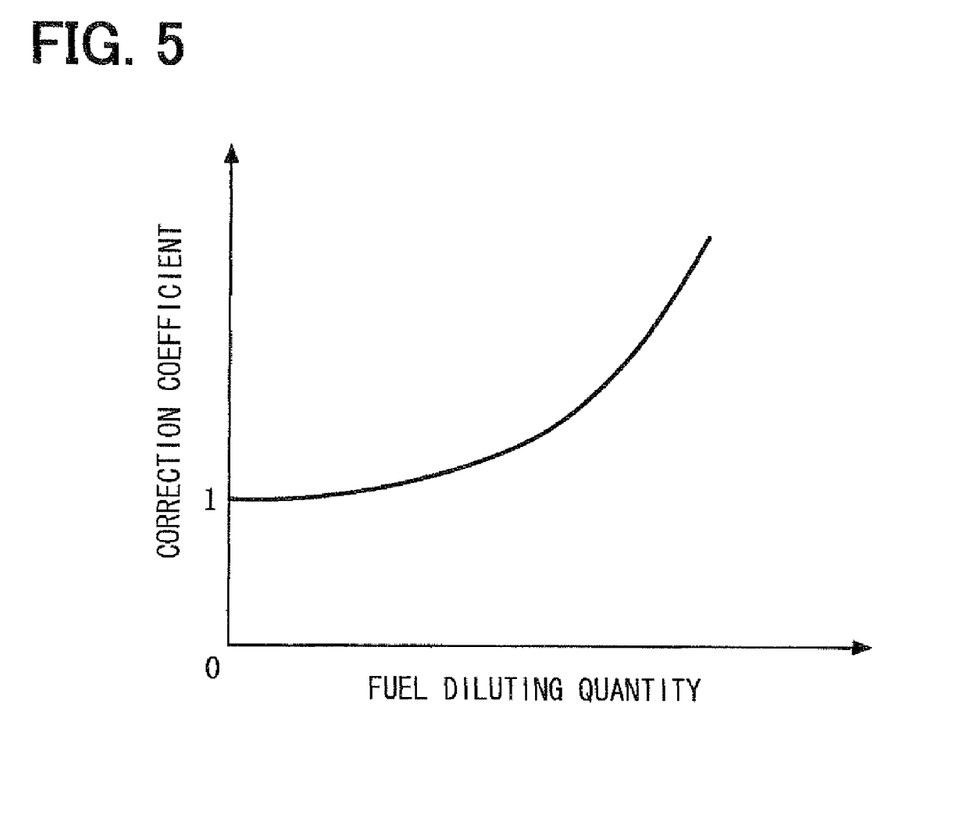
FIG. 5 is a chart conceptually showing a map of a correction coefficient.

Then, the procedure proceeds to step 110 in which a correction coefficient (CC) depending on the fuel diluting quantity is computed with reference to a map of a correction coefficient which is shown in FIG. 5. In this map, as the fuel diluting quantity becomes larger, the correction coefficient becomes larger. This map of the correction coefficient is previously formed based on experimental data and design data, and is stored in the ROM of the ECU 45.

Then, the procedure proceeds to step 111 in which the response-deterioration determination value (RDDV) is corrected with the correction coefficient (CC) to obtain a final response-deterioration determination value (FRDDV).

Final Response-Deterioration Determination Value (FRDDV)=Response-Deterioration Determination Value (RDDV)×Correction Coefficient (CC)

Then, the procedure proceeds to step 112 in which the computer determines whether the count value of the response time counter is greater than or equal to the final response-deterioration determination value (FRDDV).

When the answer is Yes in step 112, the procedure proceeds to step 113 which the computer determines that the variable valve timing controller 43 is faulty. A faulty flag is turned ON and the warning lump on the instrument panel of the vehicle is tuned ON to notify the driver of the defect. The defect information (defect code) is stored in backup RAM (not shown) of the ECU 45.

When the answer is No in step 112, the procedure proceeds to step 114 in which the computer determines that the variable valve timing controller has no defect. The faulty flag is maintained OFF to end the routine.

In the present first embodiment, since the fuel diluting quantity is estimated based on the alcohol concentration of the fuel, the fuel diluting quantity can be accurately estimated. Further, since the response-deterioration determination value is corrected according to the estimated fuel diluting quantity, the response-deterioration determination value can be properly established even though the responsiveness of the variable valve timing controller 43 is varied due to a variation in viscosity of the lubricant. Thereby, when the responsiveness of the variable valve timing controller 43 is varied (deteriorated) due to an increase in the fuel diluting quantity, it can be avoided that the computer determines that the variable valve timing controller has a defect. The accuracy of the diagnosis can be improved.

Furthermore, according to the first embodiment, since the fuel diluting quantity is estimated based on the alcohol concentration, the fuel injection quantity and the coolant temperature, the fuel diluting quantity can be estimated with high accuracy.

[Second Embodiment]

Figure 6:
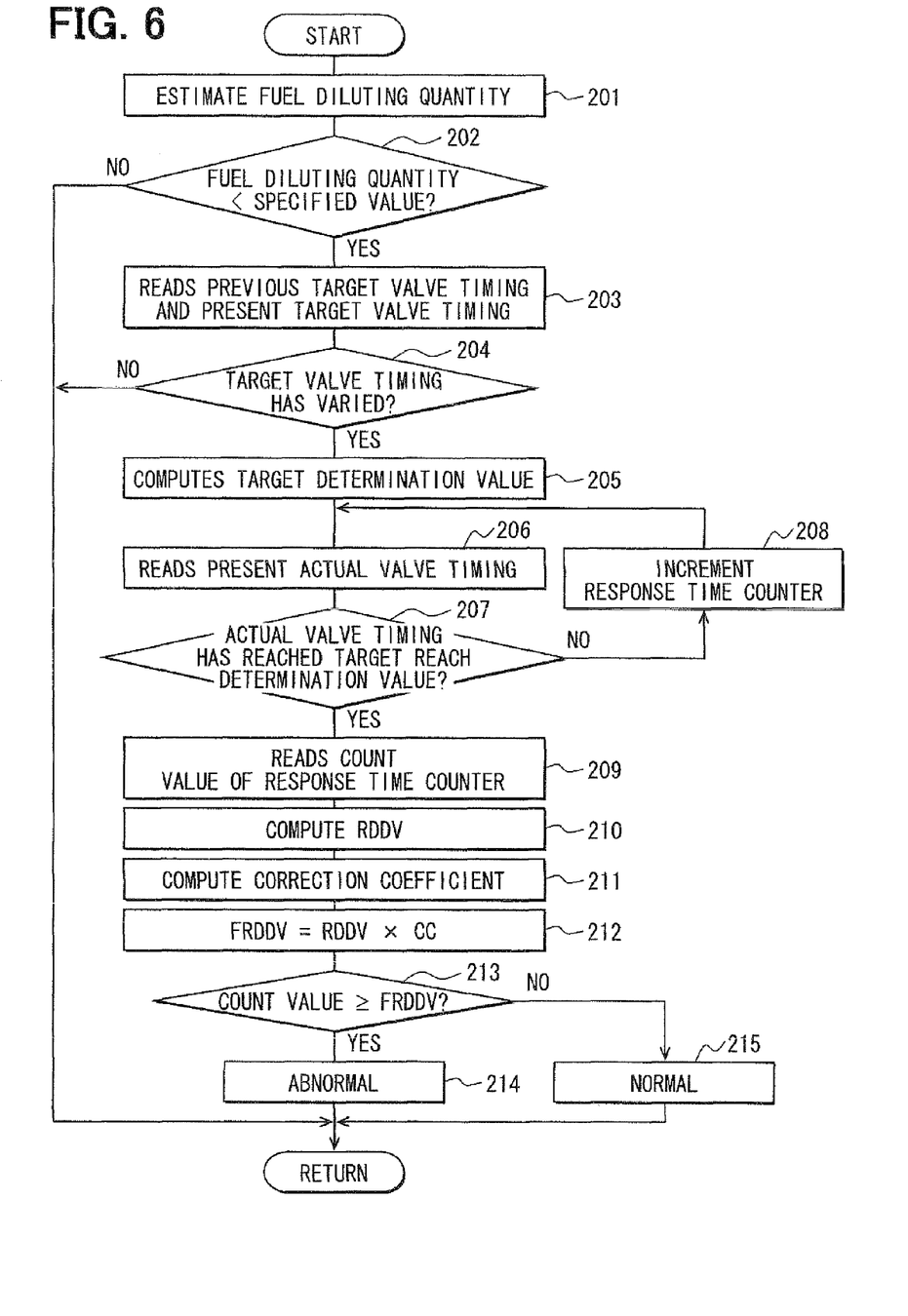
FIG. 6 is a flowchart showing a processing of a diagnosis routine according to a second embodiment.

Referring to FIG. 6, a second embodiment will be described hereinafter. In the second embodiment, the same parts and components as those in the first embodiment are indicated with the same reference numerals and the same descriptions will not be reiterated.

The ECU 45 executes a diagnosis routine shown in FIG. 6. When the fuel diluting quantity exceeds a specified value, the computer determines that it is difficult to accurately diagnose the variable valve timing controller 43. The computer prohibits the diagnosis of the variable valve timing controller 43.

In step 201, the fuel diluting quantity is estimated based on a map. The fuel diluting quantity depends on the alcohol concentration detected by the alcohol concentration sensor 41, the fuel injection quantity and the coolant temperature.

In step 202, the computer determines whether the fuel diluting quantity is less than a specified value. When the answer is NO in step 202, that is, when the fuel diluting quantity is greater than or equal to the specified value, the viscosity of the lubricant is largely varied, so that the responsiveness of the variable valve timing controller 43 is largely varied. Thus, the computer determines that it is difficult to accurately determine whether the variable valve timing controller 43 is faulty or not. The computer prohibits the diagnosis of the variable valve timing controller 43. The process in step 202 corresponds to a prohibit means.

When the answer is Yes in step 202, the procedure proceeds to step 203. In step 203, the computer reads the previous target valve timing and the present target valve timing. In step 204, the computer determines whether the target valve timing has been varied.

When the answer is Yes in step 204, the procedure proceeds to step 205 in which a target reach determination value is computed. Then, the procedure proceeds to step 207 in which the actual valve timing has reached the target reach determination value. When the answer is No in step 207, the procedure proceeds to step 208 in which the count value of the response time counter is incremented.

When the answer is Yes in step 207, the computer reads the count value of the response time counter in step 209 and computes a response-deterioration determination value in step 210.

Then, the procedure proceeds to step 211 in which a correction coefficient depending on the fuel diluting quantity is computed with reference to a map of a correction coefficient which is shown in FIG. 5. The response-deterioration determination value (RDDV) is corrected with the correction coefficient (CC) to obtain the final response-deterioration determination value (FRDDV) in step 212.

Then, the procedure proceeds to step 213 in which the count value of the response time counter is greater than or equal to the FRDDV. When the answer is Yes in step 213, the procedure proceeds to step 214 in which the computer determines that the variable valve timing controller 43 has a defect. When the answer is No in step 213, the procedure proceeds to step 215 in which the computer determines that the variable valve timing controller has no defect.

When the fuel diluting quantity is greater than or equal to a specified value, the viscosity of the lubricant is largely varied, so that the responsiveness of the variable valve timing controller 43 is largely varied. According to the second embodiment, the computer determines that it is difficult to accurately diagnose the variable valve timing controller 43, and prohibits the diagnosis thereof. Thus, an erroneous diagnosis can be surely avoided.

In the above embodiments, the response-deterioration determination value is corrected according to the fuel diluting quantity. The present invention is not limited to this. For example, the response time may be corrected according to the fuel diluting quantity.

Moreover, in the above embodiments, the fuel diluting quantity is estimated based on the alcohol concentration, the fuel injection quantity and the coolant temperature. Alternatively, the coolant temperature can be replaced by an engine oil temperature. Furthermore, the fuel diluting quantity may be estimated based on an engine speed and an engine load in addition to the above parameters. Since the fuel diluting quantity is varied according to the engine speed and the engine load, the fuel diluting quantity can be accurately estimated.

The alcohol concentration can be estimated based on at least one of an air-fuel ratio feedback correction quantity, a deviation in air-fuel ratio, a ratio between the target air-fuel ratio and an actual air-fuel ratio, a fuel pressure rising speed, a combustion stability (variation in engine speed), and an engine torque.

In the above embodiments, the present invention is applied to the valve timing controller of the intake valve. The present invention can be applied to a valve timing controller of an exhaust valve.

The present invention is not limited to an intake port injection engine. The present invention can be applied to a direct injection engine or a dual injection engine.

What is claimed is:

1. A diagnostic system for a variable valve timing control system including a hydraulic variable valve timing controller adjusting a valve timing of an intake valve and/or an exhaust valve with a lubricant of an internal combustion engine and a diagnosis means for diagnosing the variable valve timing controllers, the diagnostic system comprising:
    an alcohol concentration determination means for detecting or estimating an alcohol concentration of a fuel supplied to the internal combustion engine; and
    a fuel diluting quantity estimation means for estimating a fuel diluting quantity based on the alcohol concentration, the fuel diluting quantity representing a fuel quantity mixed with the lubricant, wherein
    the diagnosis means includes a correcting means for correcting a determination condition based on the fuel diluting quantity, and the diagnosis means performs a diagnosis of the variable valve timing controller by means of said corrected determination condition.

2. A diagnostic system for a variable valve timing control system according to claim 1, further comprising:
    a prohibit means for prohibiting the diagnosis of the variable valve timing controller when the estimated fuel diluting quantity is greater than or equal to a specified value.

3. A diagnostic system for a variable valve timing control system according to claim 1, wherein
    the fuel diluting quantity estimation means estimates the fuel diluting quantity based on a fuel injection quantity as well.

4. A diagnostic system for a variable valve timing control system according to claim 1, wherein
    the fuel diluting quantity estimation means estimates the fuel diluting quantity based on a coolant temperature and/or a lubricant temperature of the internal combustion engine as well.

5. A diagnostic system for a variable valve timing control system according to claim 1, wherein
    the fuel diluting quantity estimation means estimates the fuel diluting quantity based on an engine speed and/or an engine load as well.

* * * * *